United States Patent [19]

Mehnert

[11] Patent Number: 5,795,533
[45] Date of Patent: Aug. 18, 1998

[54] METHOD AND DEVICE FOR THE MANUFACTURING OF HOLLOW ARTICLES MADE FROM THERMOPLASTIC MATERIAL BY BLOW MOULDING

[76] Inventor: Gottfried Mehnert, Messelstrasse 25, D-14195 Berlin, Germany

[21] Appl. No.: 696,957

[22] PCT Filed: Feb. 22, 1995

[86] PCT No.: PCT/DE95/00232

§ 371 Date: Dec. 4, 1996

§ 102(e) Date: Dec. 4, 1996

[87] PCT Pub. No.: WO95/23060

PCT Pub. Date: Aug. 31, 1995

[30] Foreign Application Priority Data

Feb. 23, 1994 [DE] Germany .................. 44 05 743.1

[51] Int. Cl.[6] .................. B29C 49/18; B29C 49/32; B29C 49/50
[52] U.S. Cl. .................. 264/529; 264/542; 425/526; 425/531; 425/535; 425/536
[58] Field of Search .................. 264/529, 540, 264/526, 542, 543; 425/531, 534, 530, 527, 538, 526, 535, 536

[56] References Cited

U.S. PATENT DOCUMENTS 3,204,018  8/1965  Hagen .................. 264/542
3,504,396  4/1970  Button et al. .................. 425/531
3,579,622  5/1971  Shaw et al. .................. 264/529
3,833,700  9/1974  Adomaitis .................. 264/542

FOREIGN PATENT DOCUMENTS 37-12922  9/1962  Japan .................. 425/531

*Primary Examiner*—Catherine Timm
*Attorney, Agent, or Firm*—Juettner Pyle Piontek & Underwood

[57] ABSTRACT

The invention concerns the manufacture of hollow plastic articles by inflating a preform (4) in a blowing mandrel. The aim of the invention is to reduce the so-called cycle time—the time interval between a preform (4) entering the blowing mould (1, 1') and the next preform (4) entering the same blowing mould (1, 1')—compared with prior art methods in which the initially open mould encloses the preform along the appropriate length when the preform is extruded from the blow-moulding nozzle, the mould then being transferred to a second station, adjacent to the tubular body receiving station, where the preform is inflated by insertion of an inflation and sizing mandrel. This aim is achieved by introducing the inflation gas into the preform, received by the mandrel, while the preform is being transferred from the first station, in which the tubular body is received, to the second station, in which release is effected.

10 Claims, 4 Drawing Sheets

FIG. 5

TIME →

| # | FORM-FUNCTION | REMOVAL FUNCTION |
|---|---|---|
| 0 | STARTING POSITION<br>-MOULD OPEN IN EXTRUDER POSITION<br>-BLOWING MANDRELS SOMEWHAT RAISED<br>-1ST STAGE<br>-PREINFLATED PARISON BETWEEN OPEN MOULD HALVES | STARTING POSITION<br>-SHUTTLE WITH REMOVAL GRIPPER IN TRANSFER POSITION<br>-BLOW-MOULDED HOLLOW ARTICLES ARE TRANSFERRED TO NEXT STATION |
| 1 | CLOSING | |
| 2 | CAP SEPARATION, PINCHING AND SEVERING | |
| 3 | BLOWING WITH AUXILIARY AIR TO FACILITATE PENETRATION OF BLOWING MANDRELS | |
| 4 | BLOWING MANDRELS FULLY RAISED, 2ND STAGE CALIBRATION | |
| 5 | BLOWING AND COOLING | |
| 6 | CARRIAGE MOVEMENT LATERAL TRAVEL TO REMOVAL POSITION | |
| 7 | INTRODUCTION OF BLOWING MANDREL AND CALIBRATION | SHUTTLE WITH REMOVAL GRIPPER TRAVELS OVER MOULD |
| 8 | | REMOVAL GRIPPERS CLOSE, BLOW-MOULDED HOLLOW ARTICLES ARE HELD AT UPPER FLASH |
| 9 | MOULD OPENS, 1ST STAGE FOR REMOVAL OF HOLLOW ARTICLES | |
| 10 | BLOWING MANDRELS DOWN | |
| 11 | | SHUTTLE TRAVELS LATERALLY AND TRANSFERS BLOW-MOULDED HOLLOW ARTICLES TO NEXT STATION |
| 12 | CARRIAGE MOVEMENT LATERAL TRAVEL TO EXTRUDER POSITION | |
| 13 | MOULD COMPLETELY OPEN 2ND STAGE | |
| 14 | BLOWING MANDRELS RAISED SLIGHTLY, 1ST STAGE | |

FIG. 6

| | FORM-FUNCTION | TIME → | REMOVAL FUNCTION |
|---|---|---|---|
| 0 | STARTING POSITION<br>-MOULD OPEN IN EXTRUDER POSITION<br>-PREINFLATED PARISON BETWEEN OPEN MOULD HALVES<br>-BLOWING MANDRELS DOWN | | STARTING POSITION<br>-SHUTTLE IN BLOWING AND REMOVAL POSITION<br>-BLOWN HOLLOW ARTICLES HANGING ON BLOWING MANDRELS |
| 1 | CLOSING | | CLOSING |
| 2 | | | BLOWING MANDRELS UP |
| 3 | CAP SEPARATION, PINCHING AND SEVERING THE EXTRUDED PARISON ABOVE THE MOULD | | |
| 4 | | | |
| 5 | | | SHUTTLE TRAVELS LATERALLY AND TRANSFERS BLOW-MOULDED HOLLOW ARTICLE TO NEXT STATION |
| 6 | CARRIAGE MOVEMENT<br>LATERAL TRAVEL TO BLOWING POSITION | | |
| 7 | INTRODUCTION OF BLOWING MANDREL AND CALIBRATION | | |
| 8 | BLOWING AND COOLING | | |
| 9 | OPENING, BLOW-MOULDED HOLLOW ARTICLE REMAINS HANGING ON MANDREL | | |
| 10 | CARRIAGE MOVEMENT, LATERAL TRAVEL TO EXTRUDER POSITION | | |
| 11 | | | SHUTTLE TRAVELS TO BLOW-MOULDING AND REMOVAL POSITION |

METHOD AND DEVICE FOR THE MANUFACTURING OF HOLLOW ARTICLES MADE FROM THERMOPLASTIC MATERIAL BY BLOW MOULDING

The invention relates to a method for the manufacture of hollow articles from thermoplastic materials by blow moulding, the operation being carried out under heat. In said method a thermally plasticated parison is extruded continuously or discontinuously from a downstream parison die, is grasped by a previously opened blow mould as the mould parts are closed, and is severed from the following material, and then inflated by introduction of a blowing medium into the parison portion, known as the "preform", disposed in the mould and forced against the mould cavity wall. When preforms are formed in this manner from an extruded parison formed in a parison die from material emerging from an extruder, the term "extrusion blow moulding" —in contrast to "injection blow moulding" — is used.

The invention also relates to a device for carrying out the method.

A much-used method of this generic type consists of the following steps,

From the die of the blowing head shaping the thermally plasticated parison, a parison is extruded between the open parts of a blow mould and, when said parison has reached the required length, said mould closes around this parison portion, which then forms the preform and is subsequently severed from the following material. The closed mould with the preform is then moved laterally out of this parison or preform station into a blowing station, in which a blowing and calibrating mandrel is inserted from above into the open end of the preform.

While the preform in the closed mould in the blowing station is being shaped to form the hollow article and subsequently cooled by means of cooling channels incorporated into the mould, a new parison portion emerges from the blowing head in the parison station. This process can be temporally coordinated with the shaping and cooling and removal of the finished blow-moulded hollow article in the blowing station in such a way that a preform of precisely the correct length is present in the preform station when the open mould has travelled back from the blowing station into the preform station to receive a new preform. This method is also known as the "shuttle method" or "method with top calibration".

According to a different method, often known as "bottom calibration", which, however, is usually used for the production of relatively large hollow articles from about 30 liters and above, e.g. tanks, a blowing and calibrating mandrel is used which is disposed below the blow mould in the perpendicular part of the blowing head. Either the lower, tubular preform, which is in any case open, travels over the upright blowing mandrel and the mould closes after this has taken place, or the mould first closes around the preform and then the blowing mandrel travels vertically upwards into the open end and then inflates the preform to form the hollow article, after which, the mould is opened again after cooling and the finished hollow article is removed from the mould, which is now open. In this method only discontinuously produced preforms can be used with a stationary blowing head, and the extrusion of a parison portion from the blowing head can only commence when the previously inflated hollow article has been removed from the open mould.

In methods of the aforementioned kinds for producing hollow articles from plastic by inflating a preform in a blow mould, the time taken from the reception of a parison in the blow mould until the subsequent reception of a new preform in the same mould is known as the cycle time.

From German Patent DE-A-2052460, it is known to combine the aforementioned "shuttle method" and the "method with bottom calibration" in order to reduce the aforesaid cycle time, and, to this end, to move the blow mould together with the preform received thereby, with the downwardly disposed blowing mandrel, which is moveable together with the blow mould, between a parison receiving station and a laterally displaced station, which in this case is only a removal station, i.e. to inflate the preform to form the hollow article already on the path between the parison station and the removal station. It has been found, however, that the inflation of the preform on the path from parison receiving station to the removal station is of itself not sufficient to produce, with a thereby reduced cycle time, high-quality hollow articles with a reject quota tending towards zero. This is possible, however, with the application of this invention with the means described in the claims.

The method according to the invention and details of a device for carrying out said method are illustrated below by means of and with reference to the drawings, in which:

FIG. 1 schematically shows, on a reduced scale, a blow mould with a received parison together with a blowing and calibrating mandrel to illustrate the method according to the invention in five successive steps a to e;

FIG. 2 schematically shows a top view of a pinch tool disposed below the extrusion die of a parison head, in an open state and on a larger scale than in FIG. 1;

FIG. 5 shows a time-dependency diagram for the method of the prior art with so-called "top calibration" and a blowing station displaced laterally with respect to the parison receiving station;

FIG. 6 shows a time-dependency diagram for the execution of the steps of the method according to invention.

Figure 1A:
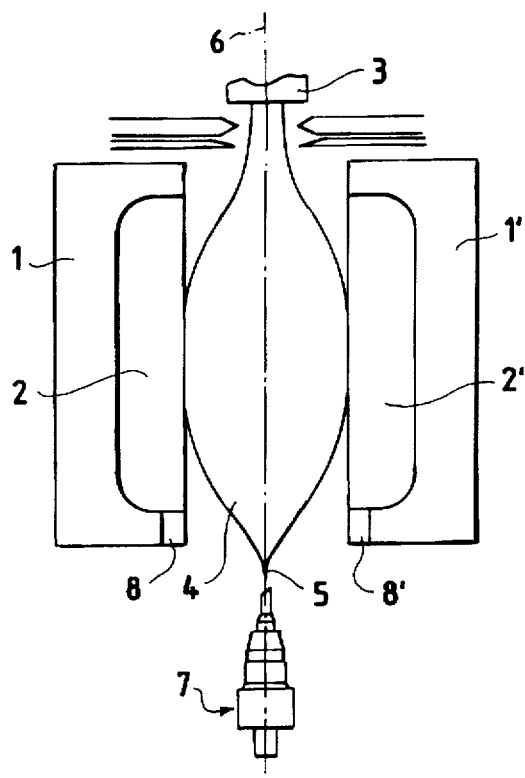
FIG. 1a to 1e show schematically, in five successive steps of the method, a blow mould, a preform, the blowing and calibrating mandrel, the tool forming the lower end of the preform, the means severing the preform from the following material at the parison-die side and an element holding the finished hollow article and transporting it further if necessary.

1 and 1' designate two blow-mould halves with the mould cavity halves 2 and 2'. This mould 1,1' is open in the preform or parison station according to FIG. 1a, i.e. the mould halves 1 and 1' are moved apart to such an extent that there is sufficient space between them for an extruded parison portion. When, after completion of return path from the removal station, the open mould assumes the position according to FIG. 1a, the parison extruded from the nozzle of a blowing head 3, which is only outlined in the diagram, has already reached the length, or almost the length, necessary for it to be grasped during closing of the mould. The lower end 5 of the parison 4 is then already closed to form a bubble 4 in a manner described with the aid of FIG. 1c. Below the blow mould 1,1', in the centre axis 6 through the blowing die, is disposed the blowing and calibrating mandrel 7, which is described in greater detail with reference to FIG. 4. The neck region of the blow mould, i.e. the part thereof which cooperates with the blowing and calibrating mandrel to shape the container opening, is designated 8 and 8'.

Figure 1B:
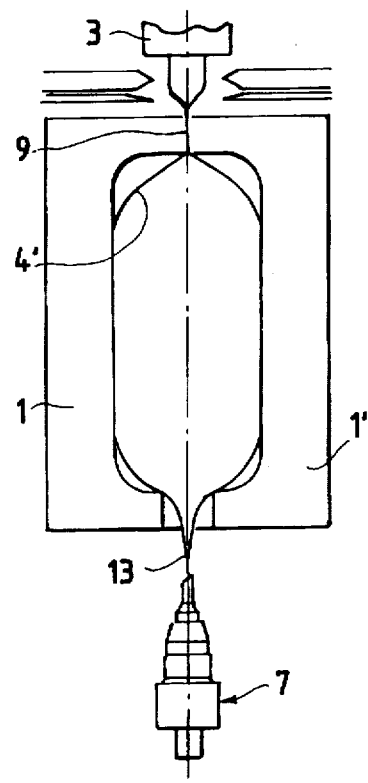

In the parison receiving station the mould halves 1 and 1' are moved together for mould closure according to FIG. 1b, as a result of which the pre-inflated parison 4 assumes the shape 4'. During this mould closing, the end 9 of the parison disposed at the blowing die side is also pinched together between the mould parts. Air is introduced Into the parison portion 4, through a channel disposed in the blowing head 3, and the parison portion is thereby pre-expanded so much that it already fills the mould cavity 2,2' in the closed mould to such an extent that it only has to be fully expanded in the upper and lower end region. This is achieved in that the greatest diameter of the parison portion 4 corresponds largely to the greatest clear width of the mould cavity 2,2' of the closed blow mould. It is expedient to work with a pre-expanded bubble, which, after mould closure, already fills the mould cavity completely, or at least to a large extent, as shown in FIG. 1b, especially when hollow articles are to be produced which are not rotationally symmetrical but have blow-moulded attachments, such as grips or handles, integrated laterally on the main body.

According to FIG. 1c, two pinch bars 10,10', arranged between the blowing head 3 and the blow-mould surface, are moved towards one another and pinch the following parison material 11 together directly below the die 3, thus closing it. At the same time, or shortly thereafter, the extruded parison portion 4' received by the closed mould is severed, below the pinch-off bar 10, from the following material 11 by means of a cutting device, e.g. knives 12,12', and thus becomes the preform 4a.

Shortly after the pinching together and severing or shortly beforehand, or simultaneously therewith, the blowing needle 14 forming a component of the blowing and calibrating tool 7, which is axially raisable and lowerable in the direction of the arrow A–B, is inserted into that lip 13 of the parison end 5 produced by the pinching off, in a manner to be described below, and the blowing medium, usually air, is injected into the preform through a blowing needle 14 forming a component of the blowing mandrel. Through openings in the cone 15 of the blowing and calibrating tool, air can also be blown laterally against the interior wall of the region 5 of the preform, which is thereby opened in a bell-shaped manner, so that that portion of the mandrel 7 provided for this purpose can be more easily introduced for calibrating the container orifice and a sealing surface as an upper seal of this orifice.

The moving together of the mould halves for mould closure around the extruded parison portion, the pinching together of the following parison material, the severing of the preform from the following parison material below the pinching together, and the introduction of the blowing and calibrating mandrel into the pinched-together lower part of the preform are carried out according to FIGS. 1a to 1c in the parison receiving station.

Figure 1C:
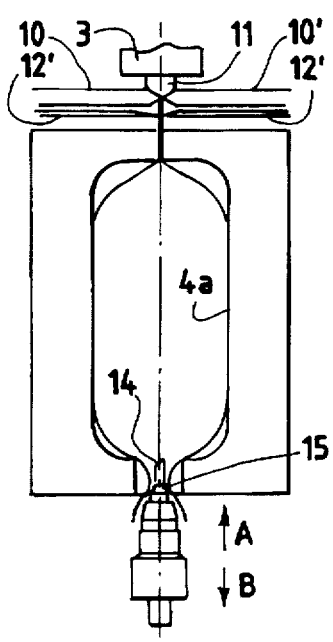
Figure 1D:
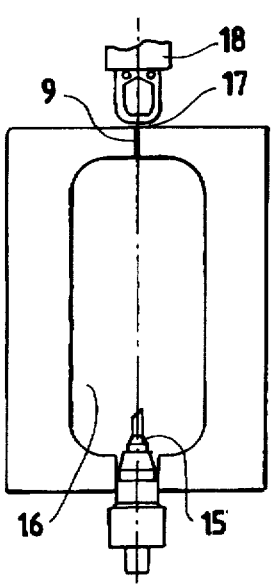
Figure 1E:
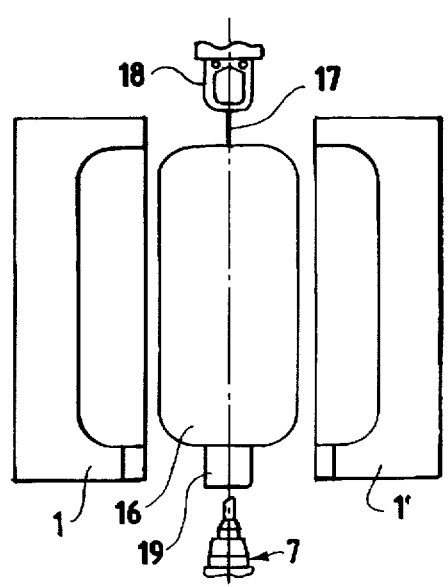

After introduction of the blowing and calibrating mandrel into the parison-receiving station according to FIG. 1c, or simultaneously with this operation, the closed mould together with the blowing and calibrating mandrel 7 introduced therein, is moved to a removal station and over this path the pre-inflated preform 4a disposed in the mould is completely inflated to form the hollow article 16 (FIG. 1d). Already over this path, or as soon as the mould has arrived at the removal station, the pinched-together preform flash 17 is gripped, e.g. by pincers 18, with which, after opening of the mould (FIG. 1e), it can be moved for further cooling or for transport into downstream work stations, e.g. for removal of the flash 17. At the same time, the blowing and calibrating mandrel is moved downwards out of the neck 19 of the hollow article 16, so that the open mould 1,1' with the mandrel 7 can be moved back into the extrusion or parison-receiving station and can receive another pre-inflated preform, which is closed at its lower end, thus starting a new hollow-article production cycle.

The device for carrying out the above-described method consists, in a manner known per se, of a parison head, which shapes the plastic material, which has been softened by pressure and heat, and extrudes it vertically downwards through a die 3, so as to form a thermoplastically deformable parison, also of a blow mould 1,1', which can be closed around the extruded parson portion 4 forming a preform and can be opened for removal of the finished blow-moulded hollow article 16, and of a blowing and calibrating mandrel, which can be introduced upwards from below into the neck region of the blow mould and removed therefrom.

The device furthermore includes a removal station disposed laterally with respect to the parison station, a means 12,12' for severing the preform from the following material at the parison-head side and a means 18 which grasps the finally blow-moulded hollow article and deposits it or feeds it to other post-finishing stations. This known device is characterized according to the invention by pinch bars closing the end emerging from the nozzle of the parison head and by a special blowing and calibrating tool.

Figure 2:
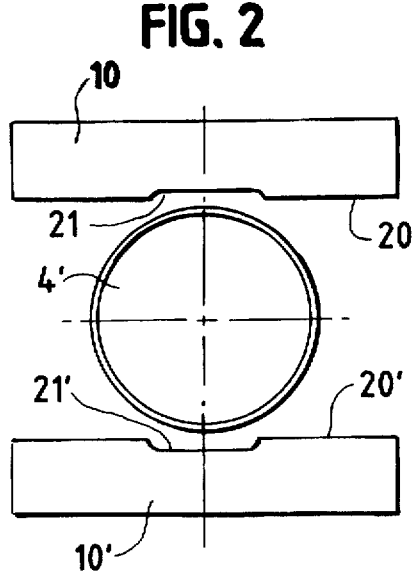
Figure 3:
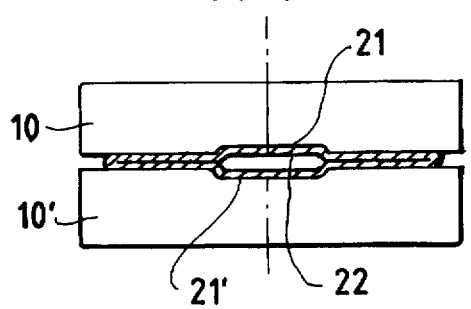
FIG. 3 shows the pinch tool according to FIG. 2 in a closed state.

To this end, it can be seen from FIG. 1c that, after the severing of the preform 4a received by the closed mould 1,1', a portion 11, resulting from the pinching with the pinch bars 12,12', remains below the die of the extrusion head 3 for the subsequent preform. This, in each case, lower end of the subsequent preform in the cycle is thus generated by the pinch bar 10,10', which is shown in FIGS. 2 and 3 in open and closed states in top view and displaced by 90° with respect to FIG. 1.

The pinch bars 10,10' each have on their inner faces 20,20' a recess 21,21', which are congruent to one another but face one another with their open sides, so that when the pinch bars travel together, the parison end 11 is not entirely pinched together, but rather a region remains which is not welded together, characterized in the diagram by a small gap 22. Here, the blowing needle forming part of the blowing and calibrating mandrel can be inserted without the danger that material might be thereby pushed inwards into the preform or said needle may slip off on the pinch seam. The slit 22, which is shown with exaggerated width in the drawing, and thus the width and, primarily, the depth of the recess 21,21' should be dimensioned such that only very little air can escape from the preform, which is pre-inflated to form a bubble, and thus the preinflated preform does not collapse, but instead the blowing needle can be reliably inserted without displacement or compression of material. It is essential that the pinching together by the bar 10,10', which generates the bubble 4 by welding the still thermally plasticated parison, is suppressed over a portion of the pinch length, even if no visible slit 22 is thereby produced.

The recesses 21,21' preventing the welding together, and thus sealing during pinching together of the parison end, do not, as in the illustrated example, have to lie precisely in the, in the drawing, vertical centre plane of the parison portion 4. They may also, depending on where the blowing and calibrating tool is to be inserted into the preform, be laterally displaced with respect to this plane. This position is in general dependent on the position of the filling and emptying orifice of the hollow article to be produced in relation to its main axis. For example, with many water and gasoline canisters, the filling and emptying orifice is disposed on the top surface of the cuboidal canister, relatively close to its narrow side, in this case, the blowing and calibrating tool must naturally also be inserted into the pre-inflated preform, which is closed at its lower end. For this reason the slit 22 or the unwelded region of the lip 5 is generated by means of correspondingly laterally displaced recesses disposed outside the main axis of the preform. In addition, the pinch bar may naturally also be designed longer than illustrated, for the production of a plurality of hollow articles in a plurality of mould cavities of a blow mould, and in this case may have a plurality of recesses 21,21' at distances from one another corresponding to the distances between the mould cavities.

Figure 4:
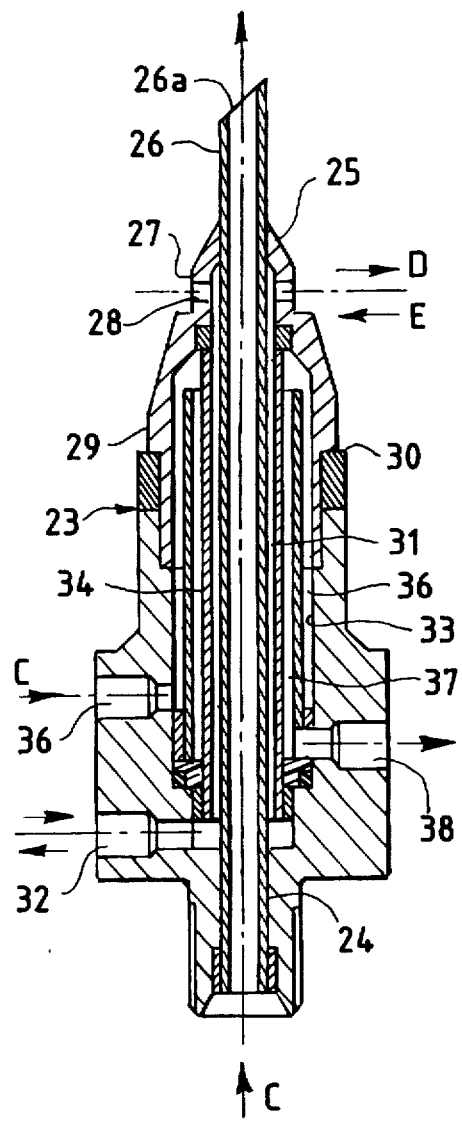
FIG. 4 shows a cross-section through a blowing and calibrating mandrel according to the invention.

FIG. 4 shows a blowing and calibrating mandrel according to the invention for the device for carrying out the method according to the invention. It comprises the mandrel body 23, which is usually multi-part for reasons of production and whose upper or head portion serves for shaping and calibrating the orifice (neck region) of the hollow article to be produced. This mandrel body is penetrated by a tube 24 located located in its main axis. The projection of said tube beyond the end of the mandrel forms, according to the invention, a blowing needle 26, expediently with bevelled tip 26a. With this blowing needle 26, the blowing and calibrating mandrel 7, on its upwards movement, travels according to FIG. 1c first into the unwelded region of the gap 22 of the preform, which is closed at its lower end 5 by the pinch bar 10,10'. The blowing medium, usually air, is introduced through the tube 24, and thus also the blowing needle 26, as indicated by arrow C, into the preform to expand the latter until it bears against the mould cavity 2,2'.

In addition, below the blowing needle 26 in the conical mandrel head or the cylindrical part 27 contiguous therewith, air-emergence holes 28 are provided, whose axes are directed such that emerging air flows out laterally or obliquely upwards, in the direction of arrow D. This, together with the shape of the mandrel, which increases from top to bottom, has the effect that the preform end is enlarged in the so-called neck region 8,8' of the blow mould and bears against the wall of said neck region, as shown schematically in FIG. 1c. During insertion of the blowing and calibrating tool 7 into the unwelded region of the end of the preform 4a at the lower neck-side, first the inflation air flowing in through the blowing needle 26 takes effect, and, when the mould halves 1,1' move together, finishes the blow moulding of the preform, which already largely fills the mould cavity. Because of the very rapid upward travel of the mandrel, the neck region of the preform is pre-formed into a bell shape by the air flowing out of openings 28 and, during further upward travel of the mandrel, is, so to speak, "calibrated" by the cylindrical portion 29 between the mandrel and the neck wall of the mould. The stop 30, interacting with the correspondingly shaped "inlet" of the neck-form part, finally shapes the sealing lip of the neck of the hollow article in a known manner.

The shaping of the neck 19 of the hollow article 16 to be produced, including its upper rim thus takes place by the interaction of the pressure of the air from the openings 28 and press moulding with the parts 29 and 30 and, as a result, the often undesirable pushing in of material during Insertion of the mandrel Into the neck region, which is particularly apparent with transparent hollow articles, is avoided.

The "auxiliary air", which emerges through the openings 28 is introduced through the channel 31 with lateral connection 32. The path 32-31-28 can be used in reverse sequence for so-called "backflushing", with which the air introduced for expanding the preform and the air disposed in the preform from the pre-inflation can be, so to speak, "Mushed out" of the hollow article in the direction of arrow E. The annular air channel 31 is shaped between the outer wall of the tube 24 and a sleeve 34 dividing the space between this outer wall and the inner wall 33 of the mandrel body. The outer wall of this sleeve 34 is cooled by means of a flowing coolant, e.g. water, which flows in through connection 35 in the annular channel 36 and flow out through the annular channel 37 connected to channel 36 and the bore 38.

Cooled air can thus be introduced into the blow-moulded hollow article and cool it internally in addition to the cooling of its outer wall by means of cooling channels in the blow mould. The hollow article is thus sufficiently quickly stabilized on removal from the mould.

FIGS. 5 and 6 are diagrams of the sequence of functions, FIG. 5 representing the sequence with known "top calibration" which is usually used and FIG. 6 the sequence with the "bottom calibration" according to the method of the invention. Both cases are known as "shuttle methods", because the closed blow mould, together with the preform that it receives, travels back and forth between a station receiving the preform extruded from the die of the blowing head and a laterally displaced station, in which the finished hollow article is removed from the mould and the mould opened. This has made it possible, already during the inflation of the preform to form the hollow article and removal of the hollow article, to extrude a new parison portion from the blowing head and, when the mould has travelled back to the starting position, for the parison piece to be received-immediately by closure of the mould parts. The time between mould closure around the parison portion already hanging with the correct length at the blowing-head and the return of the open mould into the position is known as the "cycle time", and consists of the blowing and cooling time, i.e. the time for shaping the hollow article in the blow mould, depending on the type of material, wall thickness and geometry of the hollow article, on the one hand, and the dead times on the other hand, wherein the latter do not make any contribution the actual moulding of the hollow article, but are necessary for activities other than blow moulding and cooling, such as movement of the shuttle between the stations and for mould opening and closing.

By dispensing with the subdivision into a preform receiving station and a blowing station, i.e. into a station in which the already existing preform is introduced into the closed mould and, after closing, is severed from the following material, and a station in which said preform is inflated and removed from the subsequently opened mould, and, instead, starting the inflation already in the preform receiving station and continuing this inflation during the lateral transfer to the removal station, the dead times can be significantly reduced, with the same time for blowing and cooling, as is made clear by the diagrams.

What is claimed is:

1. A method for producing a hollow article from thermoplastics by inflating a thermally plasticated preform, the method comprising the steps of: extruding the preform vertically downwards from an extruder between parts of a split blow mould located at a first station; closing the split blow mould around the preform so that the preform is positioned in a mould cavity, wherein the mould cavity substantially corresponds to the finished shape and size of said hollow article; transferring the blow mould to a second station disposed laterally to the first station; inflating the preform within the mould cavity by introduction of a blowing medium through a blowing needle into the preform; cooling the inflated preform thereby forming said hollow article, and removing the hollow article from the blow mould; wherein an upper portion of the preform located above the blow mould is severed from a following preform being extruded from the extruder and the following preform is pinched together to form a lower portion of the following preform such that the lower portion of the following preform is partially sealed but remains open over a predetermined region.

2. The method according to claim 1, wherein the following preform is partially welded and partially sealed by pinching the following preform together above the closed blow mould to form the lower portion of the following preform having a narrow gap which remains open and into which the blowing needle is inserted as the preform is received into the mould cavity.

3. The method according to claims 1 or 2, wherein the preform is extruded between the parts of the split blow mould as a downwardly partially closed, bubble-shaped preform in the first station and the bubble-shaped preform is partly expanded to pre-inflate the preform by the introduction of the blowing medium into its upper end while the preform is extruded.

4. The method according to claim 3, wherein the downwardly partially closed, bubble-shaped preform is pre-inflated up to a maximum diameter corresponding fully or largely to the largest clear width of the mould cavity of the closed blow mould.

5. A device for producing hollow articles from thermoplastics by inflating a thermally plasticated preform, comprising a first station with an extruder head for extruding a preform and a blow mould having an open and a closed position, said blow mould being positioned at said first station to receive said preform as said preform is extruded and said first station including means for severing the extruded preform proximate the extruder head; a second station laterally disposed with respect to the first station for removal of a finished blow moulded hollow article from the blow mould; means for moving the blow mould in the closed position from the first station to the second station and the blow mould in the open position back from the second station to the first station; and a blowing and calibrating tool having a blowing needle for introducing a blowing medium into the preform, wherein a pair of pinch bars are provided above the severing means and the blow mould at the first station, which seal the lower end of a following preform by pinching a lower portion of the following preform together except for a predetermined region, and wherein the blowing needle is positioned to introduce the blowing medium into the preform though the predetermined region.

6. The device according to claim 5, wherein the pair of pinch bars at the first station above the blow mould forms the lower portion of the following preform and wherein at least one bar of said pair of pinch bars has a recess facing the other bar of the pair of pinch bars to form an unwelded region or gap at the lower portion of the following preform.

7. The device according to claim 6, wherein the two pinch bars each have a congruent recess of the same size.

8. The device according to claim 5, wherein the blowing and calibrating tool comprises a mandrel body forming an orifice of the hollow article to be fully inflated, a blowing needle and a mandrel base, the mandrel body receiving a central tube connected to a feed for the blowing medium and whose portion projecting beyond the mandrel body forms the blowing needle such that the outer diameter of the mandrel body gradually enlarges from the blowing needle to the mandrel base.

9. The device of claim 8, wherein the blowing and calibrating tool further comprises a space between an inner wall of the mandrel body and an outer wall of the central tube divided by a sleeve defining an annular channel in communication with a blowing medium source, the annular channel terminating in openings below the blowing needle disposed transversely or obliquely upwards with respect to the centre axis of the mandrel body.

10. The device of claim 8, wherein the blowing and calibrating tool further comprising a space between an inner wall of the mandrel body (23) and an outer wall of the sleeve and a sleeve encompassing a portion of the height of said space to define an annular channel for supplying a coolant and an annular channel for removing said coolant.

* * * * *